(12) United States Patent
   Lima

(10) Patent No.: US 12,631,447 B2
(45) Date of Patent: May 19, 2026

(54) SYSTEM AND METHOD FOR MEASURING THE THICKNESS OF REFRACTORIES

(71) Applicant: Saint-Gobain do Brasil Produtos Industriais e Para Construção Ltda., Sao Paulo (BR)

(72) Inventor: Haysler Apolinário Amoroso Lima, Bragança Paulista (BR)

(73) Assignee: Saint-Gobain do Brasil Produtos Industriais e Para Construção Ltda., Sao Paulo (BR)

( * ) Notice: Subject to any disclaimer, the term of this patent is extended or adjusted under 35 U.S.C. 154(b) by 382 days.

(21) Appl. No.: 18/272,152

(22) PCT Filed: Jan. 11, 2022

(86) PCT No.: PCT/BR2022/050008
   § 371 (c)(1),
   (2) Date: Jul. 13, 2023

(87) PCT Pub. No.: WO2022/150897
   PCT Pub. Date: Jul. 21, 2022

(65) Prior Publication Data
   US 2024/0085175 A1     Mar. 14, 2024

(30) Foreign Application Priority Data
   Jan. 14, 2021   (BR) ......................... 102021000672-2

(51) Int. Cl.
   *G01B 21/08*          (2006.01)
(52) U.S. Cl.
   CPC .................................. *G01B 21/085* (2013.01)
(58) Field of Classification Search
   None
   See application file for complete search history.

(56) References Cited

U.S. PATENT DOCUMENTS

| | | | | |
|---|---|---|---|---|
| 4,358,953 A | * | 11/1982 | Horiuchi .................. | G01K 3/14 |
| | | | | 374/137 |
| 5,890,805 A | * | 4/1999 | Groth ....................... | G01K 7/04 |
| | | | | 374/E3.004 |

(Continued)

FOREIGN PATENT DOCUMENTS

| | | |
|---|---|---|
| AR | 000043 | 5/1997 |
| CN | 103322960 | 5/2016 |

(Continued)

OTHER PUBLICATIONS

Relatório de Pesquisa Internacional e Opinião Escrita [International Search Report and the Written Opinion] Dated Mar. 7, 2022 From the International Searching Authority Re. Application No. PCT/BR2022/050008 and Its Translation of Search Report Into English. (12 Pages).

(Continued)

*Primary Examiner* — Erica S Lin

(57) ABSTRACT

The present invention relates to a system and a method for measuring the thickness of refractories comprising a heat flux measuring device (10) for measuring the flow of heat flowing from a hot face to a cold face of the refractory, a core (11) surrounded by a thermally insulating jacket (12) comprising, in which the core (11) conducts, between a first (11a) and a second (11b) face, heat from the hot face of the refractory to the cold face of the refractory; and a measuring apparatus (20) configured to: continuously measure the temperature on the first face of the core and on the second face of the core; determining the heat flux flowing through the heat flow measuring device (10) and determining the thickness of the refractory material by means of equivalent thermal conductivity of the refractory material.

4 Claims, 2 Drawing Sheets

(56) References Cited

U.S. PATENT DOCUMENTS

| | | | | |
|---|---|---|---|---|
| 7,909,506 B2 * | 3/2011 | Zaviska | .................. | G01K 7/42 |
| | | | | 374/115 |
| 7,976,770 B1 * | 7/2011 | Gerritsen | ................. | F27B 3/24 |
| | | | | 266/46 |
| 10,859,316 B1 * | 12/2020 | Richter | .................. | F27D 21/02 |
| 2018/0347907 A1 * | 12/2018 | Lammer | ................ | C21C 5/445 |

FOREIGN PATENT DOCUMENTS

| | | |
|---|---|---|
| EP | 0195726 | 12/1989 |
| EP | 1835279 | 9/2007 |
| JP | 11-316118 | 11/1999 |
| KR | 2003-0050868 | 6/2003 |

OTHER PUBLICATIONS

Supplementary European Search Report and the European Search Opinion Dated Nov. 29, 2024 From the European Patent Office Re. Application No. 22738852.7. (6 Pages).
Examen Tecnico de Fondo [Technical Background Examination] Dated Jun. 18, 2025 From the Instituto Nacional de la Propiedad Industrial, Administracion Nacional de Patentes de Republica Argentina, INPI Argentina Re. Application No. 20220100061. (8 Pages).

* cited by examiner

SYSTEM AND METHOD FOR MEASURING THE THICKNESS OF REFRACTORIES

RELATED APPLICATIONS

This application is a National Phase of PCT Patent Application No. PCT/BR2022/050008 having International filing date of Jan. 11, 2022, which claims the benefit of priority of Brazil Patent Application No. BR102021000672-2 filed on Jan. 14, 2021. The contents of the above applications are all incorporated by reference as if fully set forth herein in their entirety.

FIELD AND BACKGROUND OF THE INVENTIONS

The present invention relates to a system and a method for continuously measuring the thickness of refractory walls during operation in high temperature environments, particularly for measuring concrete walls of blast furnace race channels. More specifically, the present invention relates to a unidirectional flow sensor, induced by an insulating refractory jacket.

To perform the measurement of refractory walls according to state of the art, it is necessary to stop the operation process so that the refractory linings can be evaluated, and then the operation can be resumed. This type of procedure ends up presenting high costs related to downtime, material expenses, and sometimes also causing unwanted emissions into the environment, making it unfeasible at certain times.

For safety reasons, the operation of related equipment must be stopped long before its potential lifetime, which increases the consumption of refractory materials and decreases equipment productivity.

In order to try to solve the above problems, the state of the art presents some solutions related to the measurement of refractory thickness.

Document JP2017227350A refers to a device and system for monitoring the refractory layer of an electric arc blast furnace. Monitoring of the refractory layer is done by means of thermocouples and the heat flow on the inner surface of the layer. Thermocouples are straight lines orthogonal to the central axis of the electric furnace and passing through the central axes of the arc electrodes.

Document JP2016221537A refers to a device and method for managing the temperature of a liquid metal reservoir and the thickness of the refractory wall of the reservoir. The method comprises temperature or heat flow measurement at least two points in the thickness direction using temperature sensors. Temperature measurements are taken at regular intervals and the data is entered into the temperature engine.

The document U.S. Pat. No. 3,512,413A refers to a device for measuring the temperature of a high temperature furnace wall. The device is made of an elongated heat-resistant body inserted in the wall with several metal conductors connected to different thermoelement points to measure the temperature and thickness of the wall. Temperature measurement can be done during the entire service life of the furnace.

Document U.S. Pat. No. 5,158,366A relates to a temperature sensor for refractory monitoring and refractory erosion location measurement device, i.e., determination of change in thickness, which can be reused and used continuously in furnaces and vessels for transporting molten metal. U.S. Pat. No. 5,158,366A presents a device with a pair of elements and an insulating medium, a resistor, and individually connected wires for measuring the erosion of a refractory. The document U.S. Pat. No. 5,158,366A discloses a system consisting of two electrodes arranged in parallel and filled with an insulating material. From the electrodes, the resistivity of the insulating material is measured in order to determine a variation in resistivity. Wear of the insulating material causes a high temperature variation that is detected by the electrodes.

Document JP2008063593A refers to a method for estimating the thickness of a wall of a vessel/reactor, e.g., blast furnace or cast-iron transport vessels. The reservoir wall thickness estimation method estimates the wall thickness by the temperature difference between the inner wall surface and the outer wall surface. However, JP2008063593A shows that only the outer surface of the furnace is measured.

Document CN101343676B presents a system for measuring the internal temperature of a furnace, in particular, a blast furnace. The CN101343676B system comprises a device formed by a metal rod, whose length corresponds to the thickness of the furnace, that extends from the outside of the furnace to the inside, crossing the entire lining. Complementarily, the system comprises a distance sensor, in particular, an ultrasound sensor to measure sound waves through the rod and return the signal. Thus, CN101343676B, teaches the use of sound velocity measurement and measurement time to determine the distance of the rod and hence the furnace thickness to be measured. Note that in CN101343676B, the metal rod wears down as the furnace wears down.

However, the state of the art does not comprise an economically viable alternative for continuous wall thickness measurement of refractories. Thus, the measurement of the remaining refractory wall thickness is carried out using equipment in a timely manner. In addition, the equipment used has a high implementation cost. Thus, a device or method is needed that makes it possible to measure refractory walls while the equipment is operating at the same time and reduce implementation costs. In this way, you get a cheaper and continuous measurement while still being advantageous in terms of safety and performance.

The technologies already known by the state of the art aim to detect the thickness of refractories, but do not present a simple and less costly solution to perform such a measurement.

Therefore, the state of the art lacks a solution that can provide continuous wall thickness measurement of refractories and that is practical to install and can be performed without interrupting the operation.

SUMMARY OF THE INVENTION

It is an object of the present invention to provide a system and method for measuring refractory thickness from heat flow measurement, aiming to improve performing the measurement more simply and continuously, without interrupting the operation.

In order to achieve the above objectives, the present invention provides a device for continuously measuring the thickness of refractory walls, the device, inserted into the refractory wall to be monitored, comprising a measuring body coated with insulation, in which on two opposite faces each comprises a temperature measurement point. The temperature at these points is measured in order to determine the heat flow between the two opposing faces. The wall thickness is calculated based on the data collected by the measurement points taking into account the material properties of the wall and the measurement body.

DESCRIPTION OF SPECIFIC EMBODIMENTS OF THE INVENTION

The following description will start from a preferred embodiment of the invention, applied to a system and method for measuring the thickness of refractories during operation by means of heat flow measurement by an apparatus such as a thermal flux meter. However, as will be evident to a person skilled in the art, the invention is not limited to a particular mode, nor is it limited to a specific device, system, or method.

Figure 1:
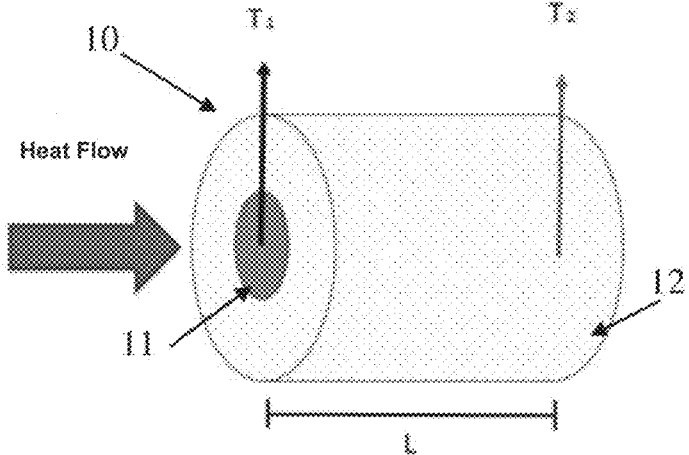
FIG. 1, shows a heat flow measuring device according to the present invention.
Figure 2:
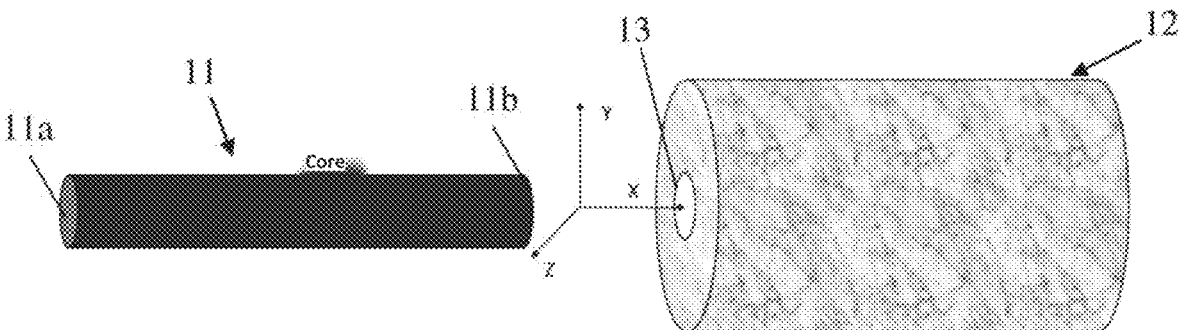
FIG. 2, shows an exploded view of the heat flux measuring device from FIG. 1.

FIG. 1 illustrates a heat flux measuring device 10 that consists of a core 11 surrounded by a thermally insulating jacket 12. The core 11 is positioned inside the jacket 12 so that it is thermally insulated in two directions and remains exposed in the third direction to measure the heat flux passing through the core. FIG. 2 shows illustrates core 11 and jacket 12 separately. Preferably, the core 11 has a cylindrical shape, whose longitudinal axis corresponds to the direction that remains exposed.

As will become evident to a technician on the subject, core 11 can have any shape that makes it possible to determine the heat flow from the temperature gradient that occurs between its ends. Thus, the core used can have a rod, bar, or cube shape.

Regarding to the material, it is noted that it is necessary to use a uniform material to make it possible to obtain the temperature difference and thus allow the heat flow calculation. For this, the internal material that forms the core 11 should be as homogeneous as possible, and preferably the core is formed by cast materials with low porosity such as stainless steel or aluminum. Alternatively, the core 11 can be of low porosity ceramics such as alumina or silica, with low porosity alumina being preferred. Thus, knowing the chosen material the material properties can be determined in advance.

Figure 3:
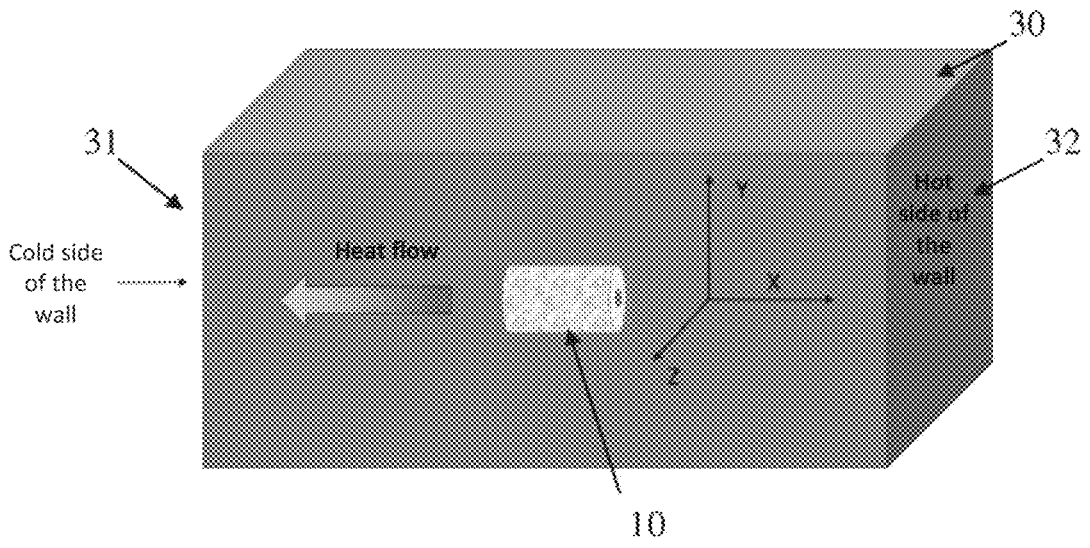
FIG. 3, illustrates a heat measuring device installed on a refractory wall according to a mode of the present invention.

FIG. 3 shows a diagram for measuring the heat flux in the refractory wall 30 to be measured, the heat flux device 10 is positioned inside the refractory wall as illustrated. To this end, a hole must be drilled in the wall of the refractory for the positioning of the heat flux measuring device 10 or the wall can be constructed with the positioning of such a device in mind.

The refractory wall 30 has an inner face 32 which is the hot face because it is closer to the high temperatures of the furnace, being exposed to the thermal fluid, and an outer face 31 which is the cold face because it faces the outside of the furnace.

The heat flow measuring device 10 is positioned so that one face 11a of the core 11 is close to the cold face 31 of the wall 30 while the other face 11b of the core 11 is closer to the hot face 32 of the wall. Therefore, it is necessary that the flow measuring device is positioned perpendicular to the wall faces 30. Thus, core 11 conducts, between the first 11a and second 11b faces, heat from the hot refractory face to the cold refractory face.

Additionally, the system according to the present invention comprises a measuring apparatus 20 comprising means for performing the measurement of temperatures at desired points.

The measurement of the temperatures of each face can be performed by sensor devices such as thermocouples positioned at each measurement point. As will be evident to one skilled in the art, the present invention is not limited to the use of thermocouples, as equivalent devices could be implemented to achieve the same effects.

In addition, the measuring device 20 has the means to compute the measurements taken continuously and to store the measured quantities. Thus, the measurement device 20 can comprise a memory and a processor, or it can be connected to a computer. The measuring device also stores information from the original refractory wall properties and the heat flow measuring device to enable comparison between the measured values and the initial system values.

In addition, the measuring device 20 may also comprise being connected to a thermocouple to measure the temperature inside the refractory. Alternatively, if this temperature is known it can be entered into the measuring device 20.

By measuring the heat flow and knowing the properties of the refractory material of the wall, and the hot-face temperature of the wall, it is possible to measure the wall thickness.

The temperatures of the two exposed faces of this core are continuously measured and stored via the temperature sensors. The exposed direction must be aligned with the predominant heat flow in the medium in which it is inserted, and consequently aligned with the thickness of the wall to be measured.

In the present invention, it is proposed to use a method of measuring the thermal conductivity of the refractory material to determine the thickness of the refractory material.

However, thermal conductivity is a property that varies between different refractory materials, in general ceramics that have irregularities such as pores, cracks or heterogeneity. Thus, the thermal conductivity of a material does not represent a reliable property for performing monitoring operations or analysis. This is because the thermal conductivity of a material represents a fixed value, whether obtained from related literature or from a thermal conductivity measurement referring to a standard reference concrete, and so it is not possible to guarantee that this value will be applicable for characterizing properties of all materials of the same type.

In order to circumvent this problem and enable the use of thermal conductivity characteristics, it is proposed the determination and use of an equivalent thermal conductivity parameter for a given material.

If the characteristics of a material are known, you can use these reference values for monitoring the material. To analyze the variation in thickness of the material, it is necessary to know the original thickness, that is, of the new refractory.

From this characteristic, you can perform the inverse calculation to determine an equivalent conductivity value. Equivalent conductivity can be used over the life of the refractory material to determine its thickness as it varies.

The thermal conductivity can be calculated using the following equation:

$$k = \frac{q\Delta x}{(T_1 - T_2)} \quad (1)$$

where k is the measured conductivity, $\Delta x$ is the original refractory thickness, q is the measured heat flux, $T_1$ is the temperature of the first core face, $T_2$ is the temperature of the heat flux measuring device.

Since the refractory material at start-up has a specific heating curve, it is possible to obtain various reference temperatures. For each temperature, the refractory material will have an equivalent thermal conductivity value, k. In this way, through mathematical regression, there will be an equation that will present the equivalent thermal conductivity value for the temperature of the refractory material.

The following will describe an example of the calculation performed by the measuring device 20 to obtain the thermal conductivity values.

The thermal fluid that is inside the refractory material, such as a steel pan, for example, is in a temperature range of approximately 1000° C. to 1600° C. The thermal fluid can be a fluid material such as pig iron, steel, aluminum, hot gases, etc. Some of the heat from the thermal fluid is transferred into the refractory wall. Heat transfer is by means of thermal conduction.

The heat flux, which represents the rate of energy transferred per unit time, is defined by Fourier's Law, shown in Equation (2):

$$q_{fluido} = \frac{k_M.A.\Delta T}{\Delta x} \quad (2)$$

where $q_{fluid}$ represents the heat flux generated by the thermal fluid, $k_M$ is thermal conductivity of the refractory material, A is the passing area of the heat flux, $\Delta T$ is the temperature change between the hot face $T_1$ and the cold face $T_2$ of the refractory wall, and $\Delta x$ is the distance between the two observed points.

The heat flow generated by the thermal fluid reaches the thermal flow meter. Therefore, the first calculation to be performed is to determine the value stream that passes through the thermal flow meter. Therefore, it is assumed that the same value flow generated by the thermal fluid in the refractory wall passes through the thermal flow meter.

The heat flux of the thermal flow meter is given by equation (3):

$$q_{TMFX} = \frac{k_{TMFX} \cdot (T_1 - T_2)}{L} \quad (3)$$

where: $q_{TMFX}$ is the heat flux flowing through the thermal flowmeter, L is the length of the thermal flowmeter, and $k_{TMFX}$ is the thermal conductivity of the thermal flowmeter.

Since the properties of the thermal flowmeter are known, and the temperatures of the hot and cold faces are measured, it is possible to determine the heat flow through the thermal flow meter.

Then, to determine the refractory wall thickness, one can perform the calculation from the variation equation (2), where the distance is isolated:

$$\Delta x = \frac{k_M (T_0 - T_1)}{q_{TMFX}} \quad (4)$$

where $\Delta x$ is the refractory thickness, $k_M$ is the thermal conductivity of the refractory material, and $T_0$ is the temperature at the hot face of the refractory.

The conductivity is determined by means of experiments in specific equipment called conductivity meters. However, there are several references in the literature that present the variations in conductivity by the variation in temperature of the same material.

As already mentioned, the use of an equivalent thermal conductivity value is proposed, where the conductivity variation for a given material is already considered, in this case, refractory concrete. Depending on the production process during operation, the refractory material can suffer from defects, such as increased porosity, for example. Such defects modify the thermal properties of the material. In other words, the material's thermal conductivity value, k, obtained by direct measurement or taken as a reference in literature, cannot be used in a fixed way. Thus, the present invention is advantageous in that it circumvents this problem of varying the thermal conductivity of the refractory material during use.

According to the example described, when the refractory is first used, information is obtained about the material's thermal properties and its thickness is determined. For example, a refractory after being demolded may have a wall thickness of 600 mm before any liquid metal is applied. This information about the material properties is entered and stored in the measuring device 20.

From the introduction of the thermal fluid, there will be a heat flow in the thermal flow meter as explained earlier. Thus, during operation and on site, the thermal conductivity can be determined from equation (5):

$$k_E = \frac{q_{TMFX}.\Delta x}{(T_{fluid} - T_1)} \quad (5)$$

Thus, a first value of equivalent thermal conductivity is obtained. This value is then recorded by the thermal flow meter.

Considering that during different thermal fluid runs there will be variation in the flux value, different conductivity values can be determined at each instant and stored appropriately. From the equivalent thermal conductivity values recorded for each thermal fluid temperature, it is possible to establish the equivalent thermal conductivity behavior or function for the material analyzed.

Additionally, from at least three measured points, mathematical regression can be used to determine the equation that will represent the variation of thermal conductivity by temperature.

In general, the equation representing the variation of thermal conductivity by temperature that will be calculated can be presented in the form:

$$K(T) = -\alpha \cdot \ln T + b \quad (6)$$

where a and b are constants determined empirically during the calculations.

Thus, this equation can be used to determine the thermal conductivity for each use of the refractory material.

In the first example, we consider an alumina ceramic wall, whose thermal conductivity is given by the equation:

$$k(T) = -11,24\ln T + 83,49 \quad (7)$$

where T is the arithmetic mean temperature between the temperatures of the hot side $T_1$ and the cold side $T_2$ of the thermal flow meter.

Considering that the temperature $T_1$ is 300° C., the temperature $T_2$ is 250° C. and, substituting in equation (7), it is determined that the thermal conductivity is 20.4 W/mK.

As can be seen above, the present invention provides a method capable of simply determining the thickness of refractory materials from heat flow measurement.

Considering that the length of the thermal flow meter is 0.039 mm, the flux value can be calculated from Equation (3):

$$q_{TMFX} = \frac{20.4 \cdot (300 - 250)}{0.039} = 26154 \text{ W}$$

Thus, the heat flux passing through the thermal flow meter is 26154 W. The next step is the calculation of the refractory thickness.

The heat flow is provided by a thermal fluid with a temperature of 1000° C.

The thermal conductivity of concrete is obtained by regression applied on data from reference literature. Mathematical regression is a statistical method that allows obtaining the relationship between the dependent variable, in this case, the thermal conductivity, and the independent variable, given by the temperature. The technique implemented according to the present invention is that of least squares. However, other statistical regression methods can be implemented to determine the relationship between thermal conductivity and temperature.

In this way, the thermal conductivity that will be calculated can be expressed by an equation of the form:

$$K(T) = aT^2 + bT + c \quad (8)$$

where a, b and c are constants determined empirically during the calculations

Thus, the thermal conductivity, k, can be expressed as:

$$K = -0,00000103x(T^2) + 0,003215x(T) + 2,75 \quad (9)$$

The temperature T used in Equation (9) is the arithmetic mean between the hot face of the refractory material and the hot face of the thermal flow meter $T_1$. However, as will be evident to a technician on the subject, a thermal profile can be used instead of using the arithmetic mean, since the latter can have a greater error. An example of a method that can be used is the finite element method. This technique uses approximation mathematical relationships to solve differential equations that represent heat flow. That is, by informing the system boundary conditions (inputs and outputs), it is possible to obtain in a stratified way the temperature at each point along the length of the refractory. Therefore, the average of all the points will give a more realistic value than taking the temperature value at two points (beginning and end of the refractory), disregarding the intermediate values.

The average temperature in this case is 634° C. Thus, substituting in Equation (9), we obtain a thermal conductivity value equal to 4.37 W/mK.

Having the value of the conductivity for this point, then the thickness can be determined by substituting the value of k into Equation (4):

$$\Delta x = \frac{4.34(1000 - 300)}{26154} = 117 \text{ mm}$$

Thus, from the determination of the conductivity for each moment of operation, having thermal fluids with different temperatures, the present invention makes it possible to determine the wall thickness of the refractory material.

This process of calculating and determining thickness can be determined continuously by the measuring device. The continuous measurement makes it possible to detect possible variations in thickness over the lifetime of the analyzed material.

Additionally, a second example of implementation of the present invention will be presented with a thermal flow meter with similar characteristics and the same thermal fluid temperature, but with a part of different thickness.

In this case, the thermal flow meter is implemented in a wall so that its hot side is at a temperature $T_1$ equal to 273° C., the cold side at a temperature $T_2$ of 251° C. Thus, the average between temperatures $T_1$ and $T_2$ is 262° C. Considering the relationship expressed by Equation (7), one has:

$$K = -11.24 \ln(262) + 83.49 = 20.9 \text{ W/mK}$$

For a thermal flow meter of the same length as in the previous example, we have the passing heat flux:

$$q_{TMFX} = \frac{20.9(273 - 251)}{0.039} = 11791 \text{ W}$$

The initial thermal conductivity values are the same as those considered for the first example, and therefore the relationship between the equivalent conductivities will also be given by Equation (9).

However, since the temperature on the hot side is 273° C., the average temperature considered will be 662° C. Substituting in Equation (9), we get a thickness of 272 mm.

Thus, it is possible to verify from the two examples presented how to determine the wall thickness of a refractory material in a simple and practical way using a heat flux measuring device.

Figure 4:
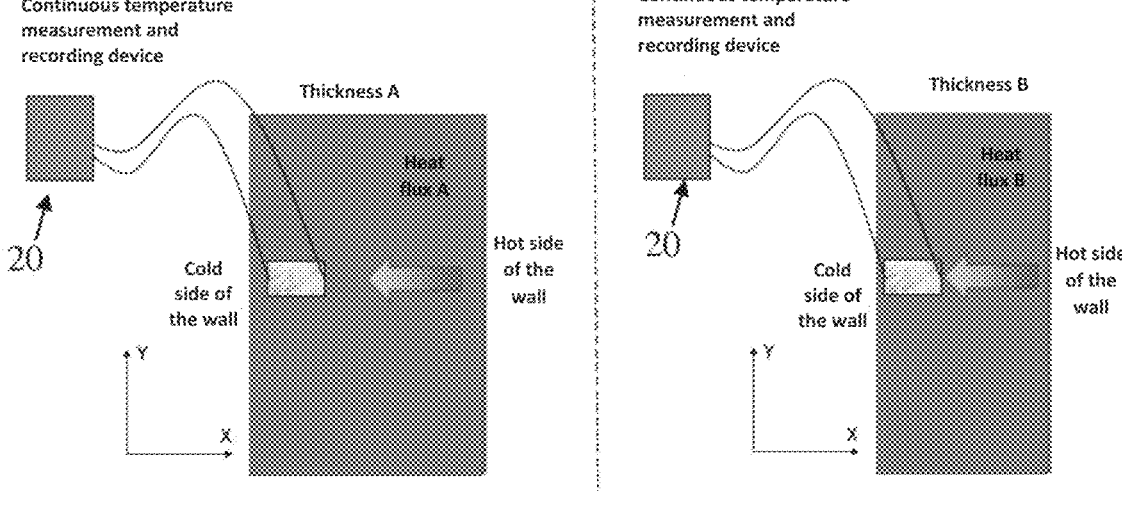
FIG. 4, illustrates a heat measuring device installed on a refractory wall according to a mode of the present invention.

To determine the thickness variation in the refractory, the values obtained using the above method can be compared. With reference to FIG. 4, which illustrates two refractory walls, the first with a first thickness A and the second with a thickness B.

However, the present invention is only capable of measuring at a specific point due to the characteristics of its installation. Therefore, preferably, strategic points should be determined from historical data and that present the worst wear for monitoring.

Numerous variations falling within the protective scope of the present invention are allowed. Thus, it is reinforced that the present invention is not limited to the particular configurations or embodiments described above.

The invention claimed is:

1. System for measuring a refractory thickness comprising:
   a heat flow measuring device measuring the heat flow from a refractory hot face to a refractory cold face, the heat measuring device comprising:
   a core surrounded by a thermally insulating jacket, wherein the core conducts heat, between a core first face and a core second face, from a refractory hot face refractory a cold face ; and
   a measuring device that:
   continuously measures a first temperature $T_1$ on the core first face and a second temperature $T_2$ on the core second face;
   determines the heat flux flowing through the heat flow measuring device (10) from the relation:

$$\dot{q}_{TMFX} = \frac{k_{TMFX} \cdot (T_1 - T_2)}{L}$$

where $q_{TMFX}$ is the heat flux flowing through a thermal flow meter, L is the length of the thermal flow meter and $k_{TMFX}$ is the equivalent thermal conductivity of the thermal flow meter;

determine the refractory thickness from the ratio:

$$\Delta x = \frac{k_M (T_0 - T_1)}{q_{TMFX}}$$

where $\Delta x$ is the refractory thickness, $k_M$ is the equivalent thermal conductivity, and $T_0$ is the temperature at the refractory hot face.

2. The system for measuring refractory thickness according to claim 1, wherein the measuring device comprises thermocouples for continuously measuring the first temperature $T_1$ on the first core face and the second temperature $T_2$ on the second core face.

3. The system for measuring refractory thickness according to claim 1, wherein the core has a cylindrical shape and is formed by a low porosity ceramic.

4. A method for measuring a refractory thickness comprising:

positioning a heat flux measuring device consisting of a core and a thermally insulating jacket inside the refractory, so that a first core face is facing a cold wall of the refractory and a second core face is facing a hot wall of the refractory;

measuring continuously by a heat measuring device the temperatures of the first core face and the temperature of the second core face;

determining, by a heat flux measuring device, a heat flux flowing through the heat flux measuring device from the relation:

$$\dot{q}_{TMFX} = \frac{k_{TMFX} \cdot (T_1 - T_2)}{L}$$

where $q_{TMFX}$ is the heat flux flowing through a thermal flow meter, L is the length of the thermal flow meter and $k_{TMFX}$ is the equivalent thermal conductivity of the thermal flow meter;

determining the thickness of the refractory material from the ratio:

$$\Delta x = \frac{k_M (T_0 - T_1)}{q_{TMFX}}$$

where $\Delta x$ is the refractory thickness, $k_M$ is the equivalent thermal conductivity, and $T_0$ is the temperature at the hot wall.

* * * * *